United States Patent
Wodrich et al.

(10) Patent No.: US 11,317,424 B2
(45) Date of Patent: Apr. 26, 2022

(54) PRIORITIZING REQUESTED NETWORK RESOURCE DELIVERY

(71) Applicant: International Business Machines Corporation, Armonk, NY (US)

(72) Inventors: Aaron T. Wodrich, Buckeye, AZ (US); Vinod A. Valecha, Pune (IN); HuyAnh Dinh Ngo, Sterling Heights, MI (US); John Blackman, Mechanicsville, VA (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 16/991,333

(22) Filed: Aug. 12, 2020

(65) Prior Publication Data

US 2022/0053504 A1 Feb. 17, 2022

(51) Int. Cl.
*H04W 72/10* (2009.01)
*H04W 24/08* (2009.01)

(52) U.S. Cl.
CPC .......... *H04W 72/10* (2013.01); *H04W 24/08* (2013.01)

(58) Field of Classification Search
CPC .............................. H04W 72/10; H04W 24/08
See application file for complete search history.

(56) References Cited

U.S. PATENT DOCUMENTS

| 6,385,458 B1* | 5/2002 | Papadimitriou | H04W 4/02 455/456.2 |
| 9,859,972 B2 | 1/2018 | Jalali | |
| 2009/0320037 A1* | 12/2009 | Gokhale | G06F 3/0631 718/104 |
| 2012/0262335 A1* | 10/2012 | Holcman | H04W 24/10 342/357.42 |

(Continued)

FOREIGN PATENT DOCUMENTS

CN 107600383 A 1/2018

OTHER PUBLICATIONS

Cooney, Michael, "Harsh wireless conditions? Send in the drone hot spot", Mar. 14, 2014, 3 pages, <https://www.networkworld.com/article/2226544/harsh-wireless-conditions--send-in-the-drone-hot-spot.html>.

(Continued)

*Primary Examiner* — Said M Elnoubi
(74) *Attorney, Agent, or Firm* — Tyrus Cartwright

(57) ABSTRACT

A system for prioritizing network resource dispatch may include receiving a request for a network resource from a mobile device associated with a user, the request comprising mobile device and user characteristics, and location information. A request priority may be determined based on some combination of a mobile device score and user score. The request priority is assigned to the request. A highest ranked mobile device request priority is determined, and the network resource is dispatched to a location corresponding to the highest ranked request priority. A heatmap may be (Continued)

generated to illustrate a geographical representation of each mobile device data usage rate at each mobile device respective location. The request priorities may change based on any combination of the mobile device characteristics, user characteristics, location information and the usage characteristics. Therefore, the priority of dispatching the network resource may be determined dynamically and updated as the inputs change.

17 Claims, 5 Drawing Sheets

(56) References Cited

U.S. PATENT DOCUMENTS

| | | |
|---|---|---|
| 2016/0028471 A1 | 1/2016 | Boss |
| 2016/0072896 A1* | 3/2016 | Petersen .............. H04W 4/021 |
| | | 709/227 |
| 2017/0257779 A1 | 9/2017 | Zerick |
| 2018/0014149 A1* | 1/2018 | Krzych ................ H04W 64/00 |
| 2018/0098227 A1* | 4/2018 | Carnelli ............. H04W 64/003 |
| 2018/0102831 A1 | 4/2018 | Murphy |

OTHER PUBLICATIONS

Disclosed Anonymously, "Prioritize Delivery of Content and Services Bases on the Attentiveness of the Consumer", An IP.com Prior Art Database Technical Disclosure, IP.com No. IPCOM000236522D, IP.com Electronic Publication Date: May 1, 2014, 6 pages.

Peck, Michael, "That Drone is a Wi-Fi Hotspot |War is Boring", Apr. 8, 2014, 5 pages, <https://warisboring.com/that-drone-is-a-wi-fi-hotspot/>.

* cited by examiner

PRIORITIZING REQUESTED NETWORK RESOURCE DELIVERY

BACKGROUND

The present invention relates generally to the field of delivering a requested network resource (e.g., internet access), and more particularly to prioritizing delivery of that network resource to a specific location.

Electronic devices have new capabilities that extend far beyond their capabilities of only a few years ago. Adding wireless network connectivity to electronic devices has enabled the advent of internet-enabled or internet-connected devices, colloquially called Internet of Things (IoT). Internet of Things (IoT) refers to the concept of extending internet connectivity beyond conventional computing platforms, such as personal computers and mobile devices, and into any range of traditionally non-internet-enabled physical devices and everyday objects. Embedded with electronics, internet connectivity, and other forms of hardware (such as sensors), these devices and objects can communicate and interact with others over the Internet, and the devices and objects can be remotely monitored and controlled.

The definition of IoT has evolved due to convergence of multiple technologies, real-time analytics, machine learning, commodity sensors, and embedded systems. Traditional fields of embedded systems, wireless sensor networks, control systems, automation (including home and building automation), and others all contribute to enabling the IoT. IoT concepts have been incorporated in sustainable access projects to increase internet access that was limited in rural areas. IoT devices and mobile devices utilize ever-increasing network resources. When those resources are constrained, some priority (or even critical) communications may be slowed or lost. Access to the world-wide-web in rural areas was limited to stationary routers hard-wired to back end networks, cellular networks and satellite connections via geostationary satellites. However, each of these options provide unique challenges for different users equipped with different device types.

Further, demands for increased bandwidths in small geographic proximities are increasing in areas where Wi-Fi access is limited. Sometimes, one or more users may need special priority over other users within the same vicinity.

SUMMARY

Aspects of the present invention disclose a method, computer program product, and computer system for prioritizing network resource dispatch. In an embodiment, one or more processors may be configured for receiving a request for a network resource from a mobile device (e.g., IoT device) associated with a user, the request comprising mobile device characteristics, user characteristics, and first location information. The one or more processors may be configured to determine a mobile device score based on the mobile device characteristics. The one or more processors may also be configured to determine a user score based on the user characteristics. Further, the one or more processors may be configured to determine a request priority based at least on some combination of the mobile device score and the user score. Once the request priority is determined, the one or more processors may be configured to assign the request priority to the request so that the request priority becomes associated with the request.

Additional mobile devices may also be included in an embodiment, wherein each of the mobile devices may be configured to perform the functions as described above herein. In this embodiment, one or more processors may be configured for receiving requests from one or more mobile devices, wherein each request may include request priorities. Each mobile device request, that is submitted to and received by the network, may include location information. In other words, when the mobile device submits a request for the network resource, the submitted request may include location information corresponding to the mobile device geographic location. The request may also include other information about the user and mobile device. Thus, the one or more processors may be configured to determine one or more request priorities for one or more mobile devices, wherein each request may include respective location information.

Among all the request priorities received, the one or more processors may be configured for determining a highest ranked request priority that is the greatest of all the request priorities. Further, the one or more processors may be configured for dispatching the network resource to a location corresponding to the highest ranked request priority. Even further, the one or more processors may be configured for generating a heatmap illustrating a geographical representation of each mobile device data usage rate at each mobile device respective location. The request may also include usage characteristics that include whether the usage type is an emergency or a non-emergency. The request priority may correspond to the emergency usage type may be the highest ranked priority. Thus, the request priorities may change based on any combination of the mobile device characteristics, user characteristics, location information and the usage characteristics. Therefore, the one or more processors may be configured to dynamically determine the priority in which to dispatch the network resource.

DETAILED DESCRIPTION

Figure 1:
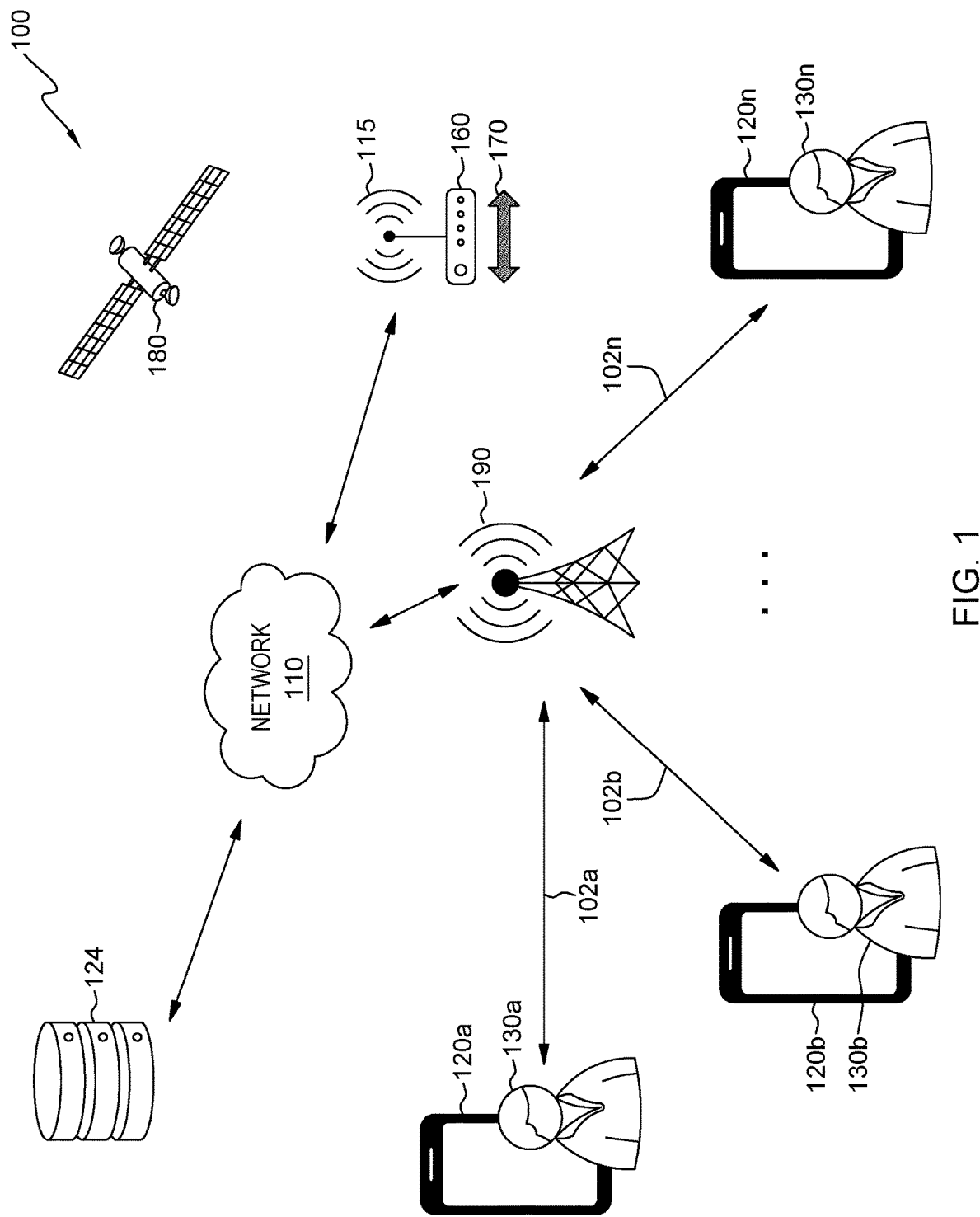
FIG. 1 depicts a network resource dispatch environment for prioritizing network resource dispatch, in accordance with an embodiment of the present invention.

Mobile communication devices are now designed with ever-increasing demands for higher data transfer speeds, higher data transfer bandwidths, and intermittent emergency access to the internet and other networks. Some applications executing on mobile communication devices require data access in remote regions where internet access is extremely limited, or, if available, not capable of providing the network availability characteristics necessary to effectively execute critical functions. Additionally, a cluster of mobile communication devices may request an immediate need for high speed, high bandwidth internet access that is not available via proximate internet access points.

In response to requests for internet access from multiple mobile communication devices, the embodiments of this invention include methods, systems, and computer program products for prioritizing internet access dispatch to the locations corresponding to the requests. In an embodiment, a method for prioritizing network resource dispatch may include one or more processors configured for receiving a request, via a network, for a network resource from a mobile device associated with a user. The request may include some combination of data corresponding to mobile device characteristics, user characteristics, and location information. In the embodiment, the one or more processors may be configured for determining a mobile device score based on a mathematical formulation of a numerical representation of the mobile device characteristics. The one or more processors may also be configured for determining a user score based on a mathematical formulation of the user characteristics.

Once the one or more processors determine the mobile device score and user score, the one or more processors may be further configured for determining a request priority based at least on the mobile device score and the user score. The one or more processors may determine the request priority based on at least one of the mobile device score or the user score, as long as at least some of the mobile device characteristics or user characteristics are used in the determination.

The one or more processors may further be configured for assigning the request priority to the request, wherein the request becomes associated with the request priority to maintain priority hierarchy among the other requests.

The system described in an embodiment in this invention may further include one or more mobile devices in communication with the network, wherein each mobile device may be configured to communicate with the network. Similar to the mobile device described above, the system may include one or more processors configured for determining request priorities for each of the one or more mobile devices. Each request priority may be associated with a respective request that may include respective location information as described above. Further, the one or more processors may be configured for determining a highest ranked request priority that would be the greater of the request priorities for the respective mobile device requests. Furthermore, the one or more processors may be configured for dispatching the network resource to a location corresponding to the highest ranked request priority.

Further, in this example embodiment, the network resource may be internet access provided via a wireless network generated by a router that is mounted to a delivery device.

The mobile device characteristics may include a mobile device type that may include a device importance rating. For example, the mobile device type may include a smartphone, tablet, laptop, two-way radio, etc. Each mobile device type may be assigned a numerical weight ranging from highest to lowest among the other mobile device types, wherein each respective weight may be based on a predefined device importance rating. For example, a device importance rating for a first mobile device may be ranked higher than a device importance rating for a second mobile device.

Example embodiments described herein may further include one or more processors configured for determining a data usage rate for each of the mobile devices in communication with the network. Data usage rates may also be provided to the network for other network connected devices to receive. The data usage rate may include some quantity of data transfer, which is measured between the mobile device and another network connected device, divided by some unit of time.

In another example embodiment of the invention disclosed herein, the one or more processors may further be configured for generating a heatmap illustrating a geographical representation of the data usage rate(s) at each respective location determined by each respective location information. The heatmap may include a geographical map with the data usage rate(s) graphically represented as a radially gradient image, wherein as the data usage rate increases, the magnitude of the radially gradient image increases, and vice versa. In other words, the radially gradient image magnitude may be directly proportional to the corresponding data usage rate.

Further, the one or more requests may further include usage characteristics corresponding to either an emergency service or a non-emergency service. The usage characteristics may correspond to data representing how data may be used by the mobile device. For example, a mobile device may be registered to emergency personnel (e.g., law enforcement officer, emergency medical personnel, and/or military personnel), where all data received at the network from the mobile device may be designated as providing an emergency service. Alternatively, the mobile device may be registered to a civilian or basic consumer, whereas all data received at the network from the mobile device may be designated as providing a non-emergency service. Furthermore, any request that is received from a mobile device including usage characteristics corresponding to an emergency service will be assigned a higher priority than a mobile device including usage characteristics corresponding to a non-emergency service. Thus, the highest ranked priority may be the request including the request priority corresponding to the emergency service.

In another embodiment, the method may include one or more processors configured for receiving, from a first mobile device having first device characteristics, a request for a network resource, the first mobile device being associated with a first user having first user characteristics. The one or more processors may also be configured for determining, based on at least the first device characteristics, a first location of the first mobile device; identifying a first coverage area generated by a first cell tower at an epicenter of the first coverage area; determining, based on at least the first user characteristics and the first device characteristics, a user priority; and dispatching the network resource to the first location based on the user priority.

The mobile device characteristics may include a signal strength that may be a dynamic value that changes according to the strength of the wireless network connection between the mobile device and the network tower or network router.

The present invention will now be described in detail with reference to the Figures.

FIG. 1 depicts a network resource dispatch environment for prioritizing network resource dispatch, in accordance with an embodiment of the present invention. The system 100 may include a network 110 configured to receive a request 102 for a network resource 115 from a mobile device 120. The mobile device 120 may be associated with a user 130. The request 102 may include mobile device characteristics, user characteristics, usage characteristics, and/or location information. The mobile device 120 may be in communication with network 110 via a cellular tower 190. The cellular tower 190 may be in communication with the network 110 as an extension of the network 110 or to provide cellular service access to mobile device 120 via the network 110. In another embodiment not shown, mobile device 120 may also be in communication with network 110 via a router, wherein the router provides wireless network access to the mobile device 120 via network 110. Therefore, the cellular tower 190 and the router 160 may be network access points configured to permit mobile device access to the network 110. The user 130 may mobilize while having mobile device 120, wherein such movement may change the location of mobile device 120, going into and out of range of either the cellular tower 190, the router 160, or both. Thus, proximity to a network access point may be monitored by the network 110 to determine if additional network coverage or network access is desired.

In another embodiment of the present invention, the network resource 115 may be internet access provided via a wireless network generated by an on-demand router 160 mounted to a delivery device 170. For example, on-demand router 160 may be stationed at a location that is within delivery device 170 mobility range. On-demand router 160 may be fixed to delivery device 170 so that when delivery device 170 receives instructions for providing network resource 115 to a location, on-demand router 160 will be transported along with delivery device 170 to that location. Delivery device 170 may be any device capable of traversing the terrain surrounding the location. For example, if the location is a rural mountainous terrain, then delivery device 170 may be an all-terrain vehicle (ATV) or an unmanned aerial vehicle (UAV). If the location is an island and the delivery device 170 is stationed on another island, then delivery device 170 may be an UAV. Furthermore, the delivery device 170 may be a human carrying the mobile device 120, wherein the mobile device 120 generates a wireless hotspot to deliver the network resource 115 to the location. Nonetheless, delivery device 170 may be determined based on the limitations of the location at which the network resource 115 is requested.

The mobile device characteristics may include a mobile device type that may include a device importance rating. A device importance rating of a first mobile device may be ranked relative to a device importance rating of a second mobile device. For example, a first mobile device may be assigned a device importance rating of 1 and a second mobile device may be assigned a device importance rating of 2, wherein the first mobile device is more important than the second mobile device, as determined by their respective device importance ratings, wherein a 1 is ranked higher than a 2.

The system 100 may include one or more processors configured to determine a data usage rate for the mobile device 120. For example, the data usage rate for a mobile device 120 may be determined by one or more processors by measuring the rate of data transfer between the mobile device 120 and one or more nearby access points. Data usage rate may be measured between the mobile device 120 and a nearby wireless router 160 or between the mobile device 120 and a nearby cellular tower 190. Data usage rate may be measured dynamically so that a real-time value may be determined. Data usage rates may be determined for a plurality of mobile devices 120*a-n*. The data usage rate may include some quantity of data transfer, which is measured between the mobile device 120 and another network connected device, divided by some unit of time.

In another embodiment, the system 100 may include one or more processors configured to generate a heatmap illustrating a geographical representation of the data usage rate at the location, wherein the location may be determined based on the location information. The heatmap may include a geographical map with the data usage rate(s) graphically represented as a radially gradient image, wherein as the data usage rate increases, the magnitude of the radially gradient image increases, and vice versa. In other words, the radially gradient image magnitude may be directly proportional to the corresponding data usage rate.

In the above-described example embodiment, the one or more processors may further be configured to receive one or more requests 102*a-n* respectively from the one or more mobile devices 120*a-n*, wherein the one or more requests 102*a-n* may further include respective usage characteristics corresponding to either an emergency service or a non-emergency service, wherein the highest ranked request priority may be the request 102 including the request priority corresponding to the emergency service. The one or more processors may be configured to perform any of the determining steps described throughout herein.

Mobile device 120 may be include a user interface configured for interacting with an owner and/or authorized user 130 of network 110. In an embodiment, mobile device 120 can send and/or receive data from network 110. In some embodiments, mobile device 120 may be a management server, a web server, or any other electronic device or computing system capable of receiving and sending data. In some embodiments, mobile device 120 may be a laptop computer, tablet computer, netbook computer, personal computer (PC), a desktop computer, a smart phone, or any programmable electronic device capable of communicating with network 110. Mobile device 120 may include components as described in further detail in FIG. 4.

Mobile devices 120*a-n* may operate as physical devices and/or everyday objects that are embedded with electronics, Internet connectivity, and other forms of hardware (i.e., sensors). In general, mobile devices 120*a-n* can communicate and interact with other mobile devices 120*a-n* over the Internet while being remotely monitored and controlled. In the depicted embodiment, mobile devices 120*a-n* may be monitored and controlled by network 110 and the owner through the user interface on each respective mobile device 120*a-n*.

In an embodiment, mobile device 120 may include a user interface for displaying user selectable elements on a surface of the mobile device 120. The user interface may be configured to operate as a local user interface on mobile device 120. In an embodiment, the user interface may be a local mobile application user interface. In another embodiment, the user interface may enable an owner of network 110 to authorize addition of mobile devices to network 110, to authorize categorizes of mobile devices and sensitive data, and to list authorized users of network 110. In yet another embodiment, the user interface may be configured to enable an owner of network 110 to view and respond to, in the form of user feedback, notifications/alerts.

Database 124 operates as a repository for mobile device data (e.g., mobile device characteristics, user characteristics, location information, usage characteristics), data usage patterns, and data usage models. A database is an organized collection of data. Database 124 can be implemented with any type of storage device capable of storing data and configuration files that can be accessed and utilized by mobile device 120, such as a database server, a hard disk drive, or a flash memory. In an embodiment, database 124 is accessed by any of the network-connected devices (e.g., mobile device 120, database 124, on-demand router 160, satellite 180) to store device data, data usage patterns, and data usage models. In another embodiment, database 124 may be accessed by mobile device 120 to access the mobile device data, data usage patterns, and data usage models. In the depicted embodiment, database 124 may reside on mobile device 120. In another embodiment, database 124 may reside elsewhere within system 100 provided database 124 has access to network 110.

Further, the one or more requests may further include usage characteristics corresponding to either an emergency service or a non-emergency service.

Figure 2:
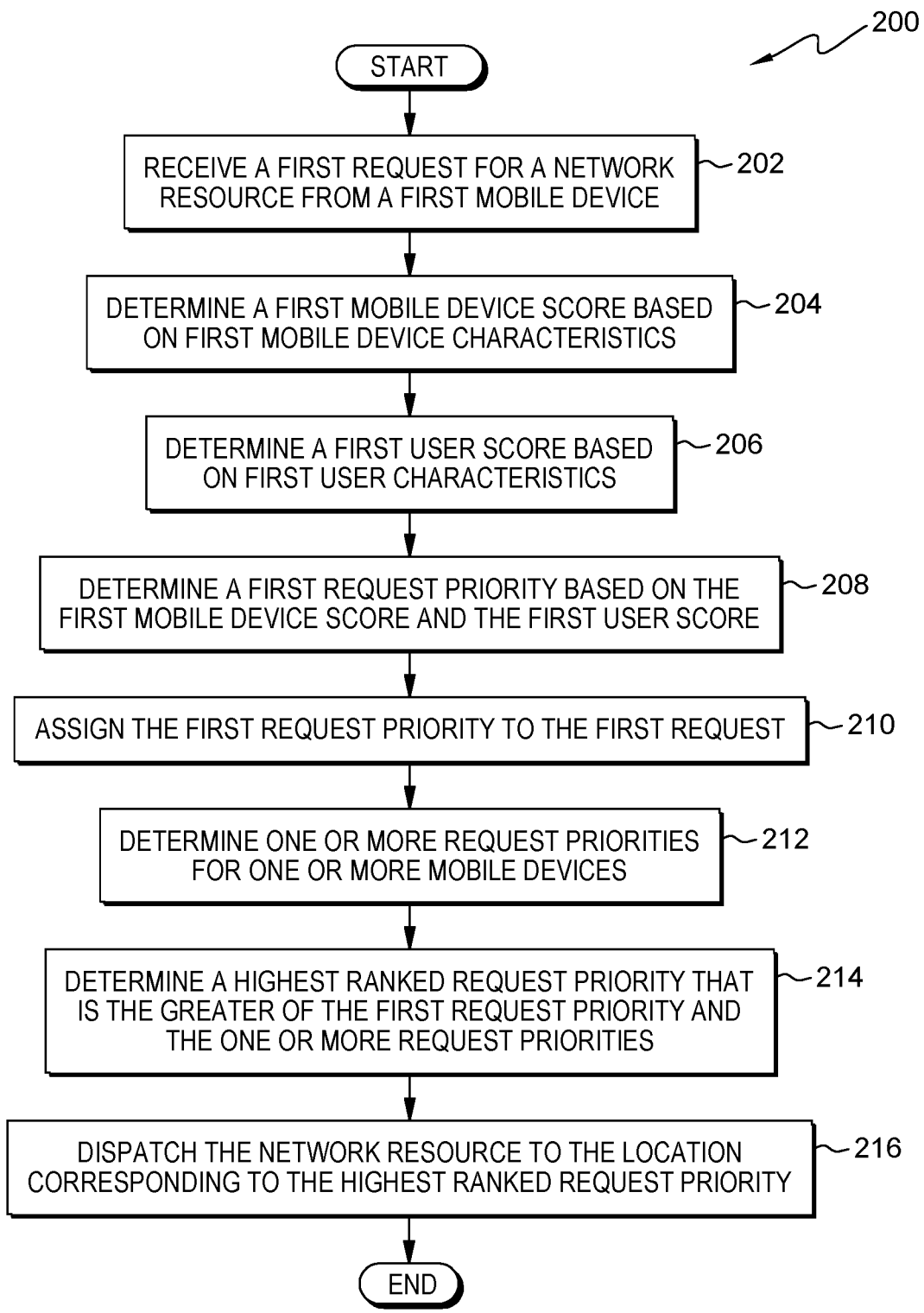
FIG. 2 depicts a flow chart of a process for prioritizing network resource dispatch, in accordance with an embodiment of the present invention.

FIG. 2 depicts a flow chart of a process for prioritizing network resource dispatch, in accordance with an embodiment of the present invention. It should be appreciated that the process depicted in FIG. 2 illustrates one possible iteration of the method 200, which repeats for each request received. In an embodiment, a method 200 for prioritizing network resource dispatch may include receiving 202 a request, via a network, for a network resource from a mobile device associated with a user. The request may include some combination of mobile device characteristics, user characteristics, and location information. The method 200 may include determining 204 a mobile device score based on a mathematical formulation of a numerical representation of the mobile device characteristics. The method 200 may also include determining 206 a user score based on a mathematical formulation of the user characteristics.

Once the mobile device score and user score are determined, the method 200 may further include determining 208 a request priority based at least on the mobile device score and the user score. The request priority may be determined based on at least one of the mobile device score or the user score, as long as at least some of the mobile device characteristics or user characteristics are used in the determination.

The method 200 may include one or more processors configured for assigning 210 the request priority to the request, wherein the request becomes associated with the request priority to maintain priority hierarchy among the other requests.

The method 200 may further include one or more processors configured for determining 212 request priorities for each of the one or more mobile devices. Each request may include respective location information as described above. Further, the method may include one or more processors configured for determining 214 a highest ranked request priority that would be the greater of the request priorities for the respective mobile device requests. Furthermore, the method may include one or more processors configured for dispatching 216 the network resource to a location corresponding to the highest ranked request priority.

Now, the method 200 will be described as it may be implemented by the system 100. In an embodiment, one or more processors may be configured to determine 204 a mobile device score based on the mobile device characteristics. Mobile device characteristics may include mobile device technical specifications as numerical representations. Associated mobile device characteristics may include mobile device characteristics of the mobile device sending the network request. For example, numerical representations of the device type, make, model, serial number, data storage capacity, size, weight, display size, display features, processor size, processor type, camera, antennae type, carrier, operating system software, and others known to those skilled in the art may be used in determining the mobile device score.

In an embodiment, a first mobile device may be a smartphone as the device type and a second mobile device may be a tablet as the device type, whereas the smartphone may be assigned a 2 as the numerical representation and the tablet may be assigned a 1 as the numerical representation. Thus, assuming all the other mobile device characteristics are not factored into the calculation, the second mobile device will have a lower mobile device score than the smartphone. Therefore, two identical mobile devices may have identical mobile device scores and non-identical mobile devices will have different mobile device scores.

In an embodiment, the method 200 may also include one or more processors configured for determining 206 a user score based on the user characteristics. User characteristics may include user biographical information (e.g., name, address, phone number, social security number, e-mail address, birthday, social media account information), user demographical information (e.g., age, marital status, occupation, employment status), wherein a numerical value may be assigned to one or more entries to determine a score. Associated user characteristics may include user characteristics of the user using the mobile device sending the network request. For example, for the occupation value, law enforcement and emergency rescue occupations may have a score of 1, whereas a university professor occupation may have a score of 2. In this example, if all other user characteristics have the same value, the user whose occupation is a law enforcement officer will have a lower user score than the user whose occupation is a university professor.

In an embodiment, the method 200 may also include one or more processors configured for determining 208 a request priority based on at least the mobile device score and the user score. Once the mobile device score and the user score are determined, the one or more processors may determine 208 the request priority by performing a mathematical operation on both the mobile device score and the user score to determine a new numerical representation that is the request priority. For example, a first mobile device 120*a* may have a first mobile device score of 3 and a first user score of 2, wherein the first request priority may be determined to be a 5 if the first mobile device score and the first user score are added together. Other mathematical operations may be performed by the one or more processors to determine another numerical representation of the mobile device score and the user score, wherein that numerical representation may be assigned to the request priority.

In another embodiment, the method 200 may include one or more processors configured for assigning 210 the request priority to the request 102, wherein the request 102 may become associated with the request priority to maintain priority hierarchy among other requests received by the network 110. For example, a first mobile device 120*a* may submit a first request 102*a* to network 110, wherein a first request priority may be determined to be a 5. Further, a second mobile device 120*b* may submit a second request 102*b* to network 110, wherein a second request priority may be determined to be a 3. The lower valued request priority may be programmed to take priority over a higher request priority, or vice versa. In the case where the lower valued request priority is prioritized over higher valued request priorities, the second request priority will be prioritized over the first request priority. Thus, since the request priorities are assigned to the respective requests, the second request will be prioritized over the first request.

In another embodiment, the method 200 may further include one or more processors configured for determining 212 one or more request priorities for one or more mobile devices 120*b-n* as described above herein, wherein each one or more mobile devices 120*b-n* may include respective location information. In other words, similar to how a request priority is determined for mobile device 120*a*, request priorities may be determined for additional mobile devices 120*b-n*. Each additional mobile device 120*b-n* may include the same type of data corresponding to the characteristics of mobile device 120*a* as described above. Further, each additional mobile device 120*b-n* may also include respective location information, wherein a location may be determined for each mobile device 120*b-n* based on the respective location information.

In another embodiment, the method 200 may further include one or more processors configured for determining 214 a highest ranked request priority that may be the greatest of the request priorities. For example, each mobile device 120*a-n* may be assigned, by the one or more processors configured, a request priority that is determined as described above herein, wherein the respective request priorities may be ordered in a hierarchal manner from least to greatest or vice versa. The request priority that is the highest ranked request priority may be designated as the highest ranked request priority in the hierarchy. The highest ranked priority may also be the lowest numerical valued request priority.

Further, the method may include one or more processors configured for dispatching the network resource 115 to a location corresponding to the mobile device 120 having the highest ranked request priority. The location may be determined by the one or more processors based on the location information corresponding to the mobile device 120 having the highest ranked request priority. The location information may include global positioning system (GPS) coordinates representing a physical geographical location of the corresponding mobile device 120. The location information may also include location data gathered by a wireless antenna of the mobile device. For example, a mobile device 120 may include a GPS antenna configured to gather data corresponding to the mobile device location by communicating with GPS satellites. Further, mobile device 120 may include a wireless antenna configured to gather location data from nearby wireless access points. The location information (i.e., GPS location data and wireless location data) may be used by the one or more processors to determine the location of the mobile device 120. Therefore, the location may be determined based on the location information.

Figure 3:
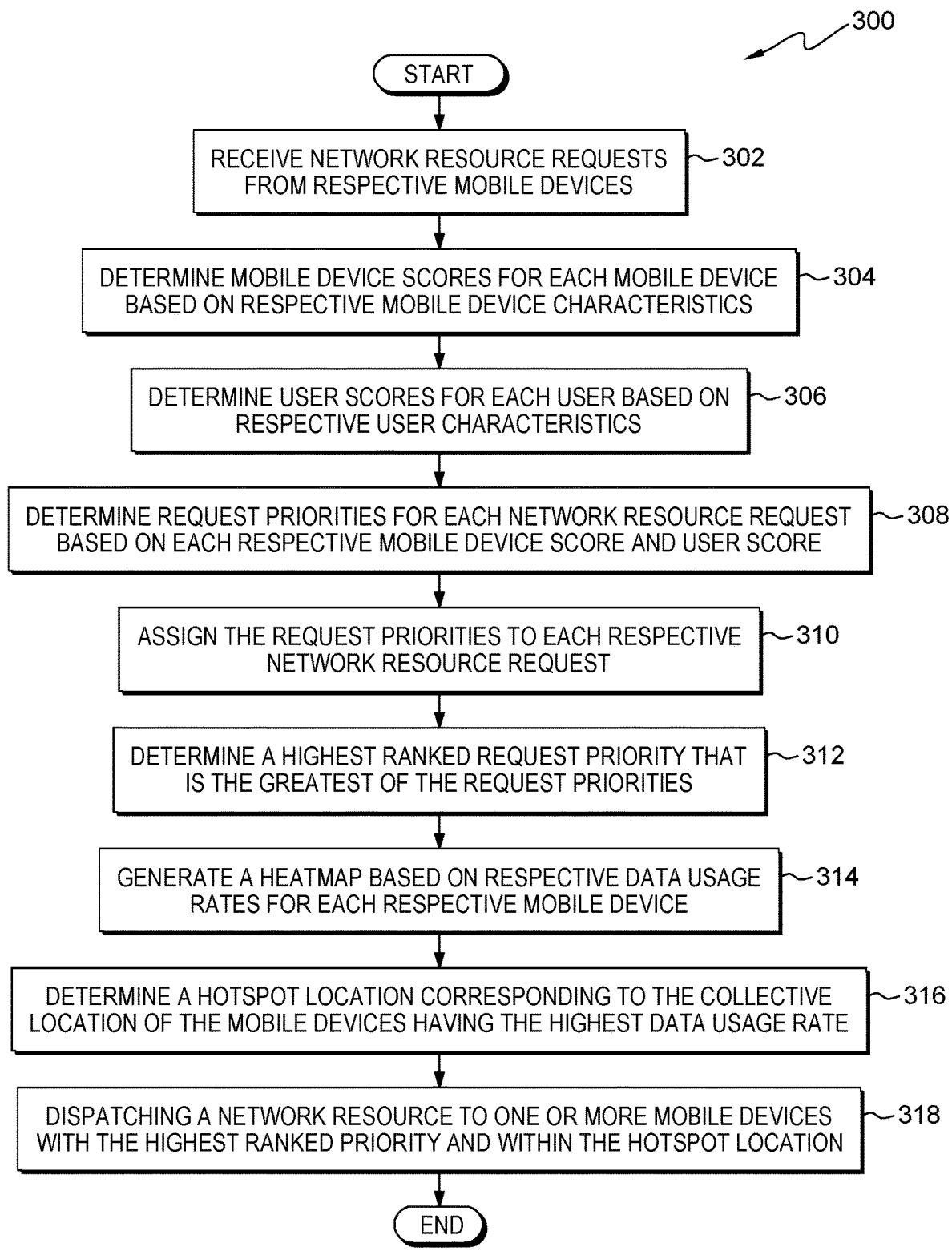
FIG. 3 depicts a flow chart of another process for prioritizing network resource dispatch, in accordance with an embodiment of the present invention.

FIG. 3 depicts a flow chart of another process for prioritizing network resource dispatch, in accordance with an embodiment of the present invention. This additional process include embodiments where multiple network requests are received at the network for multiple respective mobile devices, where the priorities for each request are determined dynamically and updated as the data used to determine the respective priorities change. The method 300 for prioritizing network resource dispatch may include one or more processors configured for receiving 302 resource requests, via a network, for a network resource from respective mobile devices each associated with a user. The requests may include some combination of mobile device characteristics, user characteristics, and location information. The method 300 may include one or more processors configured for determining 304 mobile device scores for each of the mobile devices based on respective mobile device characteristics, wherein the mobile device scores may be based on a mathematical formulation of a numerical representation of the mobile device characteristics. The method 300 may also include one or more processors configured for determining 306 a user score for each user based on a mathematical formulation of the user characteristics.

Once the mobile device scores and user scores are determined, the method 300 may further include one or more processors configured for determining 308 request priorities for each network resource request based at least on each of the respective mobile device scores and respective user scores. The request priority may be determined by the one or more processors based on at least one of the mobile device score or the user score, as long as at least some of the mobile device characteristics or user characteristics are used in the determination.

The method 300 may include one or more processors configured for assigning 310 the request priorities to the respective requests, wherein the requests becomes associated with the respective request priorities to maintain priority hierarchy among the other requests.

The method 300 may further include one or more processors configured for determining 312 a highest ranked request priority that may be the greatest of the request priorities for each of the mobile devices. Each request may include respective location information as described above.

Further, the method may include one or more processors configured for generating 314 a heatmap based on respective data usage rates for each respective mobile device.

The method 300 may further include one or more processors configured for determining 316 a hotspot location corresponding to the collective location of the mobile device(s) having the highest data usage rate(s).

Furthermore, the method may include one or more processors configured for dispatching 318 a network resource to a location corresponding to the highest ranked request priority and within the hotspot location.

Figure 4:
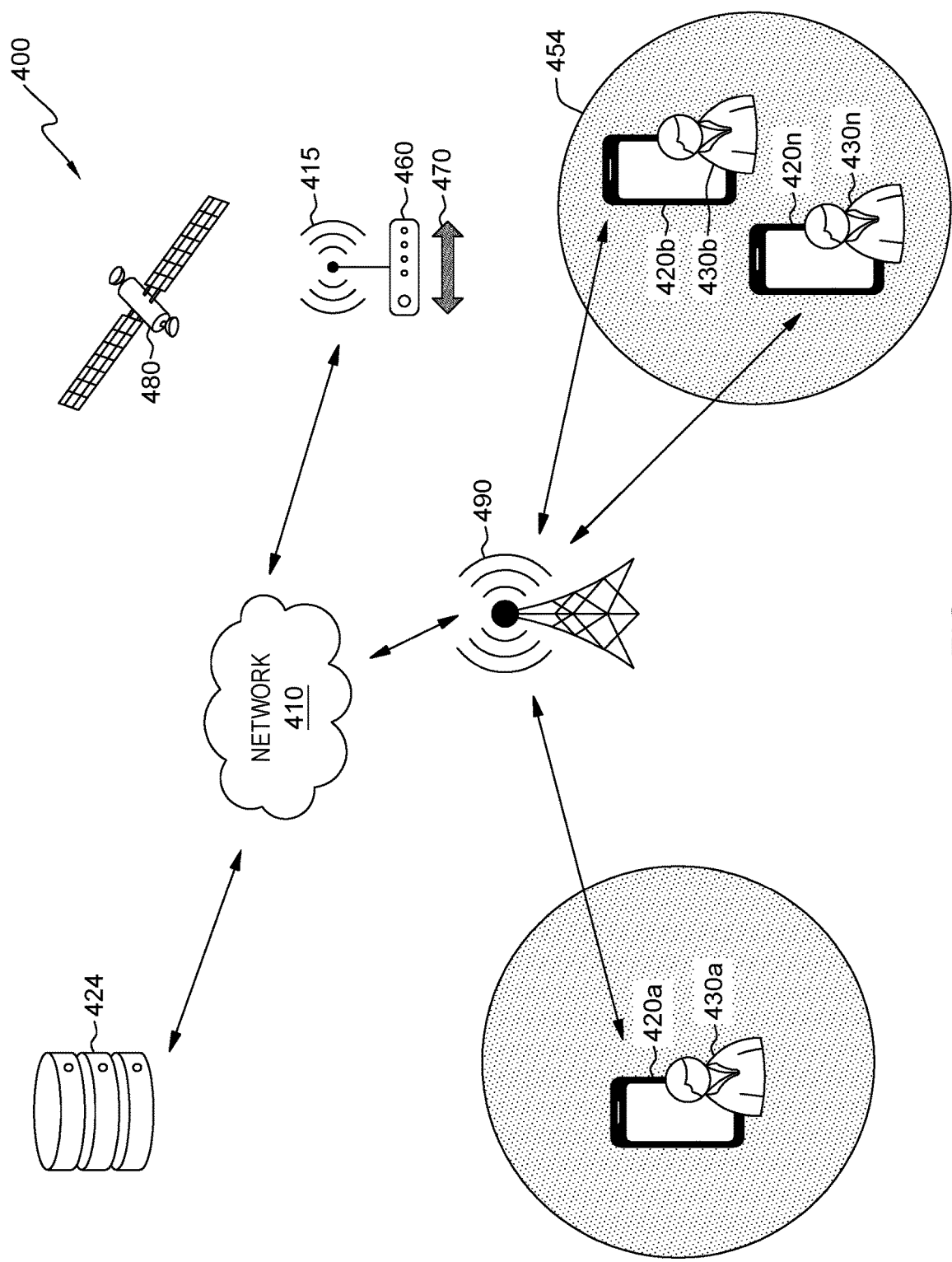
FIG. 4 depicts another environment for prioritizing network resource dispatch, in accordance with an embodiment of the present invention.

FIG. 4 depicts a system for prioritizing network resource dispatch as described in the method 300 described above, in accordance with an embodiment of the present invention. The system 400 may include a network 410 configured to receive a request 402 for a network resource 415 from a mobile device 420. The mobile device 420 may be associated with a user 430. The request 402 may include mobile device characteristics, user characteristics 432, usage characteristics and/or location information.

The mobile device 420 may be in communication with network 410 via a cellular tower 490. The cellular tower 490 may be in communication with the network 410 as an extension of the network 410 or to provide cellular service access to mobile device 420 via the network 410. In another embodiment not shown, mobile device 420 may also be in communication with network 410 via a router, wherein the router provides wireless network access to the mobile device 420 via network 410. Therefore, the cellular tower 490 and the router 460 may be network access points configured to permit mobile device access to the network 410. The user 430 may mobilize while having mobile device 420, wherein such movement may change the location of mobile device 420, going into and out of range of either the cellular tower 490, the router 460, or both. Thus, proximity to a network access point may be monitored by the network 410 to determine if additional network coverage or network access is desired.

In another embodiment of the present invention, the network resource 415 may be internet access provided via a wireless network generated by an on-demand router 460 mounted to a delivery device 470. For example, on-demand router 460 may be stationed at a location that is within delivery device 470 mobility range. On-demand router 460 may be fixed to delivery device 470 so that when delivery device 470 receives instructions for providing network resource 415 to a location, on-demand router 460 will be transported along with delivery device 470 to that location. Delivery device 470 may be any device capable of traversing the terrain surrounding the location. For example, if the location is a rural mountainous terrain, then delivery device 470 may be an all-terrain vehicle (ATV) or an unmanned aerial vehicle (UAV). If the location is an island and the delivery device 470 is stationed on another island, then delivery device 470 may be an UAV. Furthermore, the delivery device 470 may be a human carrying the mobile device 420, wherein the mobile device 420 generates a wireless hotspot to deliver the network resource 415 to the location. Nonetheless, delivery device 470 may be determined based on the limitations of the location at which the network resource 415 is requested.

The system 400 may be configured to perform the method 300 for prioritizing network resource dispatch, wherein the system 400 may include one or more processors configured to determine a mobile device score based on the mobile device characteristics, as described above herein. As described in method 300, the system 400 may include one or more processors configured to determine a user score based on the user characteristics, determine a request priority based on at least the mobile device score and the user score, assign the request priority to the request 402, wherein the request 402 may become associated with the request priority to maintain priority hierarchy among other requests received by the network 410.

The method may also determine one or more request priorities for one or more mobile devices 420a-n as described above herein, wherein each one or more mobile devices 420a-n may include respective location information.

The system 400 may further include one or more processors configured to determine a data usage rate for the mobile device 420, as described above herein.

In another example embodiment, the system 400 may further include one or more processors configured to generate a heatmap 448 illustrating a geographical representation of the data usage rate at the location, wherein the location may be determined based on the location information. Additionally, the system 400 may include generating a heatmap based on respective data usage rates for each respective mobile device. The system 400 may further include determining a hotspot location 454 corresponding to the collective location of the mobile device(s) having the highest data usage rate(s).

A collective data usage rate may also be determined for each one of a plurality mobile devices. The collective data usage rate may be a summation of data usage rates for a subset of the plurality of mobile devices in communication with the network 410. The collective data usage rate may be illustrated as a radial gradient, wherein the data usage rate is directly proportional to the gradient magnitude. For example, as the collective data usage rate increases, the gradient magnitude increases. The collective data usage rate may help to identify a cluster of mobile devices that may be consuming bandwidth beyond a predetermined threshold on the network 410. A cluster location of mobile devices whose collective data usage rate exceeds a predetermined threshold may be identified as a hotspot location 454. For example, if fifteen (15) mobile devices are within a certain proximity of each other, having a collective data usage rate beyond a predefined threshold, then a hotspot location 454 may be represented by the outer limits of each mobile device respective locations.

In another example embodiment, one or more processors may be configured to determine a first collective data usage rate for a first group of mobile devices. The one or more processors may also be configured to determine a first collective request priority for the first group of mobile devices. Further, a second collective data usage rate may be determined for a second group of mobile devices and a second collective request priority may also be determined for the second group of mobile devices. However, the data usage rates for each of the mobile device may be continuously updated as the users vary the amount of data used on the mobile devices. As the collective data usage rate change, so does the collective request priorities to reflect the change. For example, if the first group of mobile devices are associated with user types corresponding to a higher ranked request priority than the second group of mobile devices, and the data used to determine the higher request priority changes such that the collective request priority for the second group of mobile devices becomes the higher request priority, then the second group of mobile devices will be assigned the highest ranked request priority. Dynamic changes in the highest ranked request priority from one group of mobile devices to another group of mobile devices may be based on the changing characteristics and data usage rates associated with the respective mobile devices in each group. Therefore, the highest request priority for groups of mobile devices may dynamically change in response to the input data changes.

Furthermore, the method may include one or more processors configured for dispatching a network resource 415 to a location corresponding to the highest ranked request priority and within the hotspot location 454 as described above herein.

In the above-described example embodiment, the one or more processors may further be configured to receive one or more requests 402a-n respectively from the one or more mobile devices 420a-n, wherein the one or more requests 402a-n may further include respective usage characteristics corresponding to either an emergency service or a non-emergency service, wherein the highest ranked request priority may be the request 402 including the request priority corresponding to the emergency service.

Mobile device 420 may operate to execute a user interface for interacting with an owner and/or authorized user 430 of network 410. In an embodiment, mobile device 420 can send and/or receive data from network 410. In some embodiments, mobile device 420 may be a management server, a web server, or any other electronic device or computing system capable of receiving and sending data. In some embodiments, mobile device 420 may be a laptop computer, tablet computer, netbook computer, personal computer (PC), a desktop computer, a smart phone, or any programmable electronic device capable of communicating with network 410. Mobile device 420 may include components as described in further detail in FIG. 4.

User interface may be configured to operate as a local user interface on mobile device 420. In an embodiment, the user interface may be a local mobile application user interface. In an embodiment, user interface may enable an owner of network 410 to authorize addition of mobile devices to network 410, to authorize categorizes of mobile devices and sensitive data, and to list authorized users of network 410. In an embodiment, user interface may be configured to enable an owner of network 410 to view and respond to, in the form of user feedback, notifications/alerts.

Database 424 operates as a repository for mobile device data, device type profiles, device profiles, data usage patterns, and data usage models. A database is an organized collection of data. Database 424 can be implemented with any type of storage device capable of storing data and configuration files that can be accessed and utilized by mobile device 420, such as a database server, a hard disk drive, or a flash memory. In an embodiment, database 424 is accessed by any of the network-connected devices (e.g., mobile device 420, database 424, router 460, satellite 480) to store device data, device type profiles, device profiles, data usage patterns, and data usage models. In another embodiment, database 424 may be accessed by mobile device 420 to access the mobile device data, device type profiles, device profiles, data usage patterns, and data usage models. In the depicted embodiment, database 424 may reside on mobile device 420. In another embodiment, database 424 may reside elsewhere within system 400 provided database 424 has access to network 410.

Mobile devices 420a-n may operate as physical devices and/or everyday objects that are embedded with electronics, Internet connectivity, and other forms of hardware (i.e., sensors). In general, mobile devices 420a-n can communicate and interact with other mobile devices 420a, b-n over the Internet while being remotely monitored and controlled. In the depicted embodiment, mobile devices 420a-n may be monitored and controlled by network 410 and the owner through the user interface on each respective mobile device 420a-n.

Network 410 operates as a computing network that can be, for example, a local area network (LAN), a wide area network (WAN), or a combination of the two, and can include wired, wireless, or fiber optic connections. In an embodiment, network 410 is a private/secure network that includes a firewall to block unauthorized access to or from network 410 while permitting outward communication. The firewall can be implemented in either hardware or software form, or a combination of both. In an embodiment, network 410 can be connected to the Internet, depicted as Internet router 460, but the firewall prevents unauthorized Internet users from accessing network 410. In general, network 410 can be any combination of connections and protocols that will support communications between mobile devices 420a, b-n and router 460.

Figure 5:
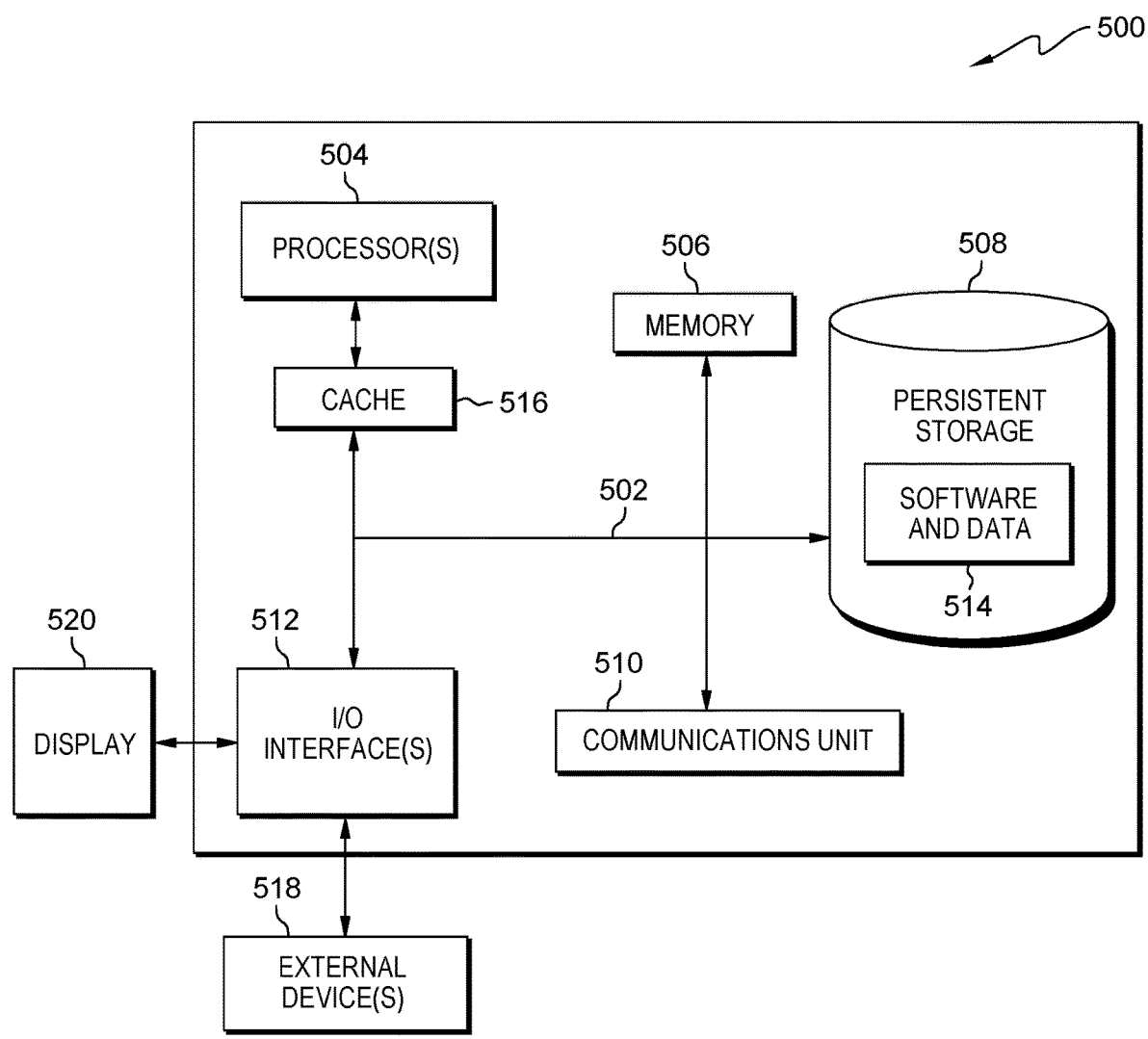
FIG. 5 depicts a block diagram of a computing device in a network resource dispatch environment, in accordance with an embodiment of the present invention.

FIG. 5 depicts a block diagram of computing device 500 suitable for mobile devices 120a-n, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

The methods 200, 300 may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, such as methods 200, 300, may be downloaded to persistent storage 508 through communications unit 510.

I/O interface(s) 512 allows for input and output of data with other devices that may be connected to mobile devices 120a, b-n. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface (s) 512 also connect to a display 520.

Display 520 provides a mechanism to display data to a user and may be, for example, a computer monitor.

The methods 200, 300 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for prioritizing network resource dispatch, the computer-implemented method comprising:

receiving, by one or more processors, a plurality of network requests for a network resource from a plurality of mobile devices associated with a plurality of users, wherein each network request of the plurality of network requests comprises mobile device characteristics, user characteristics, and location information;

determining, by the one or more processors, a mobile device score for each network request based on the respective mobile device characteristics;

determining, by the one or more processors, a user score for each network request based on the respective user characteristics;

determining, by the one or more processors, a request priority for each network request based, at least in part, on the determined mobile device score and the determined user score; and dispatching, by the one or more processors, the network resource to a first location corresponding to a highest prioritized network request, wherein the network resource is internet access provided via a wireless network generated by a router that is mounted to an unmanned aerial delivery device stationed at a second location that is within a mobility range of the delivery device.

2. The computer-implemented method of claim 1, wherein the mobile device characteristics comprise a mobile device type including a device importance rating, wherein a first device importance rating is ranked higher than a second device importance rating.

3. The computer-implemented method of claim 1, further comprising:
determining, by the one or more processors, a data usage rate for each of the plurality of mobile devices.

4. The computer-implemented method of claim 3, further comprising:
generating, by the one or more processors, a heatmap illustrating a geographical representation of each of the data usage rates for the plurality of mobile devices at each respective location determined by each respective location information.

5. The method of claim 1, wherein the plurality of network requests further comprises respective usage characteristics corresponding to either an emergency service or a non-emergency service.

6. The method of claim 5, wherein the highest prioritized network request is a network request of the plurality of network requests corresponding to the emergency service.

7. A computer program product for prioritizing network resource dispatch, the computer program product comprising:
one or more computer readable storage media and program instructions stored on the one or more computer readable storage media, the program instructions comprising:
program instructions to receive a plurality of network resource requests from a plurality of mobile devices associated with a plurality of users, wherein each network request of the plurality of network requests comprises respective mobile device characteristics, user characteristics, and location information;
program instructions to determine a mobile device score for each network request based on the respective mobile device characteristics;
program instructions to determine a user score for each network request based on the respective user characteristics;
program instructions to determine a request priority for each network request based, at least in part, on the determined mobile device score and the determined user score; and
program instructions to dispatch the network resource to a first location corresponding to a highest prioritized network request, wherein the network resource is internet access provided via a wireless network generated by a router that is mounted to an unmanned aerial delivery device stationed at a second location that is within a mobility range of the delivery device.

8. The computer program product of claim 7, wherein the respective mobile device characteristics comprise a mobile device type including a device importance rating, wherein a first device importance rating is ranked higher than a second device importance rating.

9. The computer program product of claim 7, further comprising:
determining a data usage rate for each of the plurality of mobile devices.

10. The computer program product of claim 9, further comprising:
generating a heatmap illustrating a geographical representation of each of the data usage rates for the plurality of mobile devices at each respective location determined by each respective location information.

11. The computer program product of claim 7, wherein the plurality of network requests further comprises respective usage characteristics corresponding to either an emergency service or a non-emergency service.

12. The computer program product of claim 11, wherein the highest prioritized network request is a network request of the plurality of network requests corresponding to the emergency service.

13. A computer system for prioritizing network resource dispatch, the computer system comprising:
one or more computer processors;
one or more computer readable storage media;
program instructions stored on the one or more computer readable storage media for execution by at least one of the one or more processors, the program instructions comprising:
program instructions to receive a plurality of network resource requests from a plurality of mobile devices associated with a plurality of users, wherein each network request of the plurality of network requests comprises respective mobile device characteristics, user characteristics, and location information;
program instructions to determine a mobile device score for each network request based on the respective mobile device characteristics;
program instructions to determine a user score for each network request based on the respective user characteristics;
program instructions to determine a request priority for each network request based, at least in part, on the determined mobile device score and the determined user score; and
program instructions to dispatch the network resource to a first location corresponding to a highest prioritized network request, wherein the network resource is internet access provided via a wireless network generated by a router that is mounted to an unmanned aerial delivery device stationed at a second location that is within a mobility range of the delivery device.

14. The computer system of claim 13, wherein the respective mobile device characteristics comprise a mobile device type including a device importance rating, wherein a first device importance rating is ranked higher than a second device importance rating.

15. The computer system of claim 13, further comprising:
determining data usage rates for each of the plurality of mobile devices; and
generating a heatmap illustrating a geographical representation of the data usage rates at each respective location determined by each respective location information.

16. The computer system of claim 13, wherein the plurality of network requests further comprises respective usage characteristics corresponding to either an emergency service or a non-emergency service.

17. The computer system of claim 16, wherein the highest prioritized network request is a network request of the plurality of network requests corresponding to the emergency service.

* * * * *